Patented May 13, 1947

2,420,519

UNITED STATES PATENT OFFICE 2,420,519

ETHERIFIED ANHYDRO HEXITOLS

Kenneth R. Brown, West Chester, Pa., assignor to Atlas Powder Company, Wilmington, Del., a corporation of Delaware No Drawing. Original application May 31, 1939, Serial No. 276,647. Divided and this application July 13, 1943, Serial No. 494,529

7 Claims. (Cl. 260—345)

The present invention relates to fully etherified, particularly fully alkylated, anhydro derivatives of the hexitols.

A more particular object of the invention is to provide new substances comprising the fully methylated ethers of the above-mentioned anhydro derivatives.

The anhydro hexitols are inner ethers resulting from the splitting off of water from the hexitols, six carbon straight chain hexahydric alcohols. The removal of one molecule of water results in the formation of a hexitan. The removal of two molecules of water results in a hexide. The formation of hexitans and hexides may be generally represented as follows:

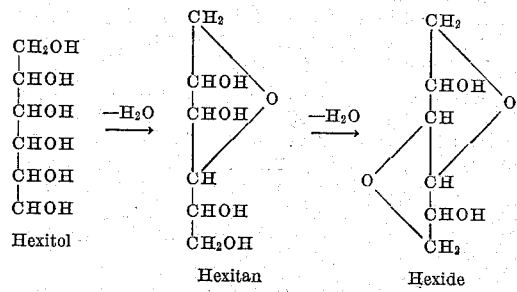

Hexitol     Hexitan     Hexide

Different anhydro hexitols are formed depending upon the particular parent hexitol and upon the particular carbon atoms between which inner ether linkage occurs. The nomenclature of the anhydro hexitols follows the hexitols from which they may be derived; thus, the hexitol, sorbitol, on removal of one mol of water may form any of a number of sorbitans, and on removal of two mols of water may form any of a number of sorbides; similarly, mannitans and mannides may be derived from the hexitol, mannitol.

It has been found that the fully alkylated ethers of these anhydro-hexitols possess a number of valuable properties. These ethers have been found to possess very good chemical and thermal stability, among other properties, which render them valuable in a wide variety of uses.

In particular, the fully methylated materials have the unique combination of solubility in both water and organic solvents, very low volatility (about the same as glycerol), comparatively low viscosity, chemical stability, good thermal stability, and no apparent ill physiological effects. The odor of the materials is faint and slightly fishy and ethereal. The methyl ethers are not noticeably hygroscopic.

This combination of properties recommends the methyl ethers for use as plasticizers, extractants and solvents, impregnating fluids for woods, blending agents, fine lubricants, and many other purposes.

The ethers can be prepared by isolating the particular hydroxylated material and thereafter alkylating, arylating or aralkylating the same. An alternative method which will be preferred in many cases is to etherify the product of reduction of a reducible sugar. In reducing sugars such as glucose for example, particularly by the electrolytic process, a variety of hydroxylated materials is obtained and the mixture of these materials can be etherified without separating them since they exhibit in common many chemical properties, including their reaction to the usual etherifying agents. The etherification of this mixture is carried on until the material is substantially completely etherified. The mixed ethers can then be classified, if desired, as by fractional distillation, to obtain ether fractions which may contain in some cases only a single ether or in other cases a mixture of ethers which are chemically and physically very closely related so that the reactions of the mixture are practically those of a pure compound.

The present invention is particularly concerned with the methyl ethers because methylation occurs more readily than etherification with the higher alkyl radicals or with aryl radicals. The methylation procedures applicable to this situation are well known in the art. For instance, methylation by means of dimethyl sulfate and alkali has been practised generally on many hydroxylated substances. Another method is to form the sodium or potassium alcoholates and react these derivatives with an alkyl halide, preferably the iodide.

In the case of the highly hydroxylated compounds, it is necessary with the known etherification procedures to repeat the etherifying step two or more times in order to obtain the completely etherified materials.

One method which can be employed for completely etherifying the difficultly etherified hydroxy compounds is that described in the article by Muskat, J. A. C. S. 56, 693 and 2449 (1934).

An improvement rendering this process more practical is described and claimed in the application of Sol Soltzberg, Ser. No. 224,272, filed August 11, 1938, now Patent No. 2,234,200. In both the Muskat process and the said improvement thereon, the alkali metal derivative of the hydroxy compound is prepared in liquid ammonia, the ammonia removed and the alkali metal derivative reacted with a halide of the radical desired as substituent. The above-mentioned improvement consists in the addition of an inert diluent such as benzene to the ammoniacal suspension of the alkali metal derivative in order to facilitate the complete removal of the ammonia and to obtain the alkali metal derivative in suspension in the diluent in order to facilitate later reaction with the halide.

It is preferable in the etherification of highly hydroxylated compounds to introduce one or more of the substituent groups, in other words form a partial ether, by some suitable treatment before performing the etherification in liquid ammonia just described. This partial etherification makes the subsequent treatment in ammonia proceed more readily to etherify the compound completely.

While the following examples deal with forming methyl ethers, it will be apparent to those skilled in this art that other alkyl ethers can also be made, as well as aryl ethers and aralkyl ethers. The reagents to be used and manner of reacting them to produce these other ethers are within the knowledge of those skilled in the art. However, the methyl ethers are the most readily prepared.

The first example describes a process for preparing the dimethyl ether of sorbide from a pure sample of sorbide by the use of known etherifying reactions.

*Example 1*

32 g. of sorbide (dianhydro-sorbitol) were methylated with 40 g. dimethyl sulfate in alkaline solution. The product, after one distillation, was a colorless oil, soluble in water and most organic solvents, having a boiling point of 116° C. at 3 mm. of mercury pressure, and a refractive index of 1.460 at 23° C.

Example 1 can be applied directly to the formation of the di-ethers of mannide, dulcide and the other di-anhydro hexitols (generically termed hexides). The tetra-ethers of sorbitan, mannitan, dulcitan and the other mono-anhydro hexitols (generically termed hexitans) can also be prepared by the use of dimethyl sulfate in caustic solutions although it is usually necessary with these compounds to repeat the methylation to obtain satisfactory quantities of the tetra-ethers.

The above-described method is directed to the production of a particular ether from previously isolated hexitans and hexides. In many instances, however, it is not necessary to obtain these ethers as separate compounds and mixtures of several types can be employed satisfactorily. Particularly is this latter situation true where the inert characteristics are useful, as in impregnating or lubricating uses for instance. In such cases the separation of the individual hydroxylated materials from a mixed reduction product, or their preparation from other sources can be avoided and a mixture, such as can be produced by the reduction of sugars, used as the starting material.

It is known that monosaccharides, such as glucose, fructose, etc., are reducible electrolytically or by catalytic hydrogenation. It is also possible to hydrolyze and reduce the more complex sugars in the same process. When the reduction is accomplished under conditions wherein the sugar is chemically attacked before reduction, the product will contain various hydroxy by-products in addition to the direct reduction product. The present invention contemplates anhydro-hexitol ethers made from the product produced by controlling the reduction according to the knowledge of those skilled in this art so that the product contains substantial amounts of hydroxylated materials of five and six carbon atoms, including hexitols, anhydro-hexitols, desoxy hexitols and desoxy pentitols.

The mixture of reduction products can be etherified by the known procedures since the mixture consists largely in hydroxy-bodies which react similarly with etherifying agents. The reaction is continued and repeated if necessary to give a substantially completely etherified product. At this stage the mixture consists, for the most part, of chemically unreactive ethers which can be used for their physical properties of low vapor pressure, low viscosity, wide solubility, solvent power, etc. These ethers are high boiling bodies and tend to decompose before boiling at normal pressures.

Depending on the character of the mixture to be etherified and the composition of ethers desired, the mixture as produced by the reduction can be modified by selective removal of one or more of the reduction products. Thus, the reduction of glucose may result in the production of larger amounts of sorbitol and mannitol than are wanted in the form of ethers and so the sorbitol and mannitol or as much as desired can be removed, for instance, by precipitating mannitol with ethanol and by stripping the sorbitol with pyridine.

After etherification of the mixed polyhydric materials it is desirable for many purposes to resolve this mixture of ethers into fractions which more closely resemble pure compounds. The substantially completely etherified materials are much more readily separated than the hydroxylated starting compounds. This separation of the ethers can be accomplished conveniently by fractional distillation since the ethers are substantially more volatile than the unetherified materials and do not decompose as readily on heating. The fractionation should be performed at reduced pressure, however, in order to avoid decomposition. It is possible by fractional distillation to take from an etherified electrolytic or catalytic reduction syrup a number of fractions which boil within small ranges, have definite physical characteristics, such as optical rotation and index of refraction, and which may be treated generally as though they were pure compounds. Some of these fractions undoubtedly contain two or more isomeric forms but the etherification which breaks up the hydroxyl groups removes many of the characteristic differences which exist in physical properties of the isomeric bodies.

*Example 2*

As a specific example of the etherification of mixed hydroxylated materials produced by the reduction of sugars, the following example of the methylation of the product of electrolytic reduction of glucose is given.

A syrup produced by electrolytically reducing glucose and having a pyridine number of 77 was first stripped of most of its sorbitol content by crystallizing with pyridine. The residue was then freed of pyridine by repeated vacuum distillation with water.

Sufficient of this stripped residue to contain 250 g. of solids was placed in a 12 liter 3-necked flask with 100 ml. of water. The flask was equipped with a sealed mechanical stirrer, a reflux condenser and two dropping funnels, one funnel dropping through the condenser.

The flask and contents were kept in a bath at 70-75° C. while 42% potassium hydroxide (equivalent to 30% sodium hydroxide) and dimethyl sulfate were simultaneously added through the funnels with good stirring at such a rate that about 220 ml. of caustic and 90 ml. of dimethyl sulfate were introduced in 10 minutes. In all, 1440 ml. of dimethyl sulfate and 3500 ml. of potassium hydroxide solution were used.

After all the reagents were added the temperature of the water bath was raised to boiling and kept there for 1½ to 2 hours. The flask was removed and the excess alkali neutralized with concentrated hydrochloric acid.

The potassium sulfate was filtered out and washed thoroughly with hot methyl alcohol. The combined filtrate and washings were evaporated to dryness under reduced pressure. The dried residue was thoroughly extracted with hot methyl alcohol and the extract evaporated to dryness under reduced pressure. The yield was 330 g. of crude material containing some alcohol soluble potassium ethyl sulfate.

In order to methylate completely, the viscous crude syrup was dissolved in 1500 ml. of anhydrous liquid ammonia contained in a gallon silvered Dewar vessel equipped with a mercury sealed mechanical stirrer, a dropping tube for sodium and a dropping funnel for benzene. Sodium was added carefully in small portions at first until no more was used up as indicated by the persistence of a blue color for 15–20 minutes. This required 65 g. of sodium. About 500 ml. of anhydrous benzene were added as a diluent and the ammonia was boiled off by passing dry air through glass tubes immersed in the ammonia. When most of the ammonia was gone, the residue was transferred to a 2 liter round bottom flask and the residual ammonia was removed under vacuum with slight warming. Then the calculated quantity of methyl iodide on the basis of sodium used was dropped in carefully with shaking since considerable heat is generated. When all had been added, the reaction mixture was allowed to stand for about 1½ hours at 45° C. Then about 500 ml. of water were added to take up the sodium iodide and the benzene layer was recovered, dried and concentrated under vacuum.

The product so obtained, a thin liquid, was subjected again to treatment in liquid ammonia, this time requiring 15 g. of sodium, and the subsequent operations repeated. The final product, 300 g. of a mobile liquid, was 99.9% methylated as determined by the acetin value.

The completely methylated material was readily soluble in both water and most organic solvents, had very low volatility (about the same as glycerol), comparatively low viscosity and good chemical and thermal stability.

*Example 3*

The substantially completely methylated material produced in Example 2 was separated by fractional distillation at reduced pressure. The mixture of ethers was thereby resolved into 6 fractions, the constants of which are set out in the following table.

| No. | B. P. C. 10 mm. | $n_{25}$ | $[\alpha]_D^{25}$ | Composition |
|---|---|---|---|---|
| | | | Degrees | |
| 1 | 95 | 1.4232 | −15.5 | tetramethyl hexitan $C_6H_8O(OCH_3)_4$ |
| 2 | 114.5 | 1.4312 | −0.5 | tetramethyl branched chain desoxy pentitol $C_5H_9(OCH_3)_4$ |
| 3 | 118.5 | 1.4328 | +6.0 | pentamethyl branched chain desoxy hexitol $C_6H_9(OCH_3)_5$ |
| 4 | 121.5 | 1.4314 | +1.0 | Do. |
| 5 | 125 | 1.4312 | +15.5 | Do. |
| 6 | 134.5 | 1.4352 | +5.7 | hexamethyl hexitol $C_6H_8(OCH_3)_6$ |

For most practical purposes the separate fractions produced by this distillation can be considered and used as though they consisted of pure compounds, although, as a matter of fact, some at least of the fractions undoubtedly contain ethers of isomeric compounds and they may even contain small quantities of other ethers of very similar boiling points.

It has been found that methyl ethers falling into the above classes are produced whenever the product of electrolytic reduction or catalytic hydrogenation, under conditions to give five and six carbon atom by-products, is completely methylated. The invention therefore contemplates substantially completely methylated ethers of the anhydro-hexitols, either in the form of the unseparated mixture of these ethers, with the methylated ethers of the other 5 and 6 carbon atom polyhydric materials produced by the reduction of sugars, or in the form of an anhydro-hexitol ether fraction of such a mixture.

The present application is a division of my application Serial No. 276,647, filed May 31, 1939.

The above specific examples have been given by way of illustration of the invention and the invention is not to be taken as limited to the specific processes set out in the examples but is to be limited only by the scope of the following claims.

I claim:

1. As a new product an anhydro-hexitol completely etherified with radicals selected from the group consisting of alkyl, aryl and aralkyl radicals.

2. As a new product the complete methyl ether of an anhydro-hexitol.

3. As a new product a hexitan completely etherified with radicals selected from the group consisting of alkyl, aryl and aralkyl radicals.

4. As a new product tetramethyl hexitan having a boiling point of about 95° C. at a pressure of 10 mm. of mercury.

5. As a new product a dimethyl hexide.

6. As a new product a hexide completely etherified with radicals selected from the group consisting of alkyl, aryl and aralkyl radicals.

7. As a new product a dimethyl sorbide.

KENNETH R. BROWN.

REFERENCES CITED

The following references are of record in the file of this patent:

UNITED STATES PATENTS

| Number | Name | Date |
|---|---|---|
| 2,106,188 | Power et al. | Jan. 25, 1938 |
| 1,757,468 | Muller | May 6, 1930 |

OTHER REFERENCES

Muskat, J. Am. Chem. Soc., 56, 693–695, 1934.
Irvine et al., J. Chem. Soc., London, 105, 918–921.